United States Patent [19]

Cadwell

[11] Patent Number: 4,988,037
[45] Date of Patent: Jan. 29, 1991

[54] METHOD AND APPARATUS FOR SUPERPLASTIC FORMING AND DIFFUSION BONDING OF HOLLOW PARTS

[75] Inventor: Gilbert C. Cadwell, Lakeside, Calif.

[73] Assignee: Rohr Industries, Inc., Chula Vista, Calif.

[21] Appl. No.: 264,817

[22] Filed: Oct. 31, 1988

[51] Int. Cl.[5] .................... B23K 20/00; B23K 20/22; B23K 19/00

[52] U.S. Cl. .................... 228/265; 228/118; 228/193; 228/243; 228/44.3; 219/78.02

[58] Field of Search ............ 228/44.3, 5.1, 118, 228/181, 125, 265, 193, 237, 243; 219/78.02, 78.16, 385, 440; 420/902

[56] References Cited

U.S. PATENT DOCUMENTS

| | | | |
|---|---|---|---|
| 3,071,853 | 1/1963 | Price et al. | 228/44.3 |
| 3,408,728 | 11/1968 | Fickett et al. | 228/243 |
| 3,412,917 | 11/1968 | Omley | 228/44.3 |
| 3,862,489 | 1/1975 | Weisinger | 228/237 |
| 3,980,220 | 9/1976 | Wolfe et al. | 228/243 |
| 4,087,037 | 5/1978 | Schier et al. | 228/44.3 |
| 4,141,483 | 2/1979 | Untilov et al. | 228/243 |
| 4,162,758 | 7/1979 | Mikarai | 228/243 |
| 4,429,824 | 2/1984 | Woodward | 228/44.3 |

Primary Examiner—Sam Heinrich
Attorney, Agent, or Firm—Patrick J. Schlesinger; Frank D. Gilliam

[57] ABSTRACT

A method and apparatus for superplastic forming and diffusion bonding of hollow metal parts. A forming assembly is prepared by surrounding a hollow tool (typically having a frusto-conical exterior) with a part blank having a corresponding shape, attaching parts, such as rings, to the exterior of the blank, then surrounding those parts with a skin blank. The forming assembly is placed in a pressure chamber, a heater is placed within the assembly and the chamber is sealed. The assembly of parts is heated to the diffusion bonding temperature of the parts while subjecting them to high gas pressure. The skin blank is deformed into intimate contact with the adjacent surfaces of the other parts and all of the parts are diffusion bonded together at all interfaces to form a unitary product. Gas pressure is released and the product is cooled and removed from the chamber and hollow tool. Any desired finish machining is accomplished and the productive is complete.

6 Claims, 2 Drawing Sheets

METHOD AND APPARATUS FOR SUPERPLASTIC FORMING AND DIFFUSION BONDING OF HOLLOW PARTS

BACKGROUND OF THE INVENTION

This invention involves the superplastic shaping and diffusion bonding of metal parts and, in particular, the shaping and bonding of hollow parts.

Superplastic forming and diffusion bonding have been found to have a number of advantages in the manufacture of parts, particularly for high strength, light weight, aerospace applications. A number of high performance alloys, such as titanium alloys, exhibit superplasticity; that is, the capability of developing unusually high tensile elongation with little tendency toward local necking during deformation. Many of these alloys can be bonded together by diffusion bonding; that is, the solid-state, metallurgical joining of metal surfaces by applying appropriate temperature and pressure for a time sufficient to permit co-mingling of atoms at the joint interface. In combination, these two techniques promise greater manufacturing efficiency, lower labor costs and great material savings through much reduced machining.

Superplastic forming and diffusing bonding are often accomplished through hot isostatic pressing in which a uniform pressure is applied while the components are maintained at a suitably high temperature.

Hot isostatic pressing of flat or nearly flat parts has long been used to form metal, plastic and composite parts to precise dimensions. Typically, a die having a forming surface is placed with the forming surface uppermost. The material to be formed is placed on the forming surface and a blanket or bag is placed over the assembly. The enclosed space is evacuated or flushed with an inert gas. The assembly is placed in an autoclave and subjected to high temperatures and pressures for an appropriate period. While this process is very effective for producing flat or nearly flat structures, problems are encountered with more three-dimensional structures, especially with hollow structures.

Attempts have been made to design complex, removable molds for hot isostatic pressing of complex or hollow shapes. Typical of these is the mold system disclosed by Borchert et al in U.S. Pat. No. 4,575,327. These molding systems require a large number of parts, sliding together at angles which will permit removal after molding. The molds are expensive, difficult to design, and produce imprecise, out-of-tolerance parts with flash or other surface irregularities unless very carefully assembled.

In some cases, particulate material has been used to apply approximately isostatic pressure for hot isostatic pressing of complex parts. Such an arrangement is described, for example, by Rigby et al in U.S. Pat. No. 4,552,710. Precise shaping is difficult with such materials and interaction between particles may prevent true isostatic pressure application.

In some cases, superplastic forming and diffusion bonding are combined in a two step process. For example, as disclosed by Cogan in U.S. Pat. No. 4,071,183, two parts can be formed by superplastic forming, then reinforcing pieces can be placed between the parts and diffusion bonded thereto. This complex method has difficulty in obtaining proper alignment of parts and obtaining uniform diffusion bonding.

Simultaneous superplastic forming and diffusion bonding is possible with simple structures, such as is shown by Elrod in U.S. Pat. No. 4,263,375. Here, a simple rib at the bottom of a rectangular cavity is diffusion bonded to a sheet which is pressed down into the cavity and into contact with the rib by gas pressure. This method is effective with simple structures but cannot accommodate hollow structures or those with significant undercuts.

Thus, there remains an unmet need for a method and apparatus for superplastic forming and diffusion bonding of hollow structures.

SUMMARY OF THE INVENTION

The above-noted problems, and other, are overcome by the method and apparatus of this invention which uses a hollow, externally configured forming surface against which an assembly of parts is superplastically formed and diffusion bonded together.

A hollow supporting tool, having an exterior shaping surface which is usually a surface of revolution, is provided. A part blank having an interior surface corresponding to the tool exterior is placed thereover. Any parts to be bonded to the part blank, such as rings, are attached thereto such as by spot welding. End rings engage the outer surface of the part blank at each end and are sealingly bonded thereto, such as be thin weld beads. In many cases, these rings become part of the final product. If such end rings are not required in the final product, they can be cut or machined away after forming and bonding of the product is complete. A skin blank is then placed over the assembly of part blank and discrete parts and the assembly is sealed to the end rings (such as by weld beads), forming a hollow, sealed, part assembly.

The assembly of parts and supporting tool is placed in a pressure vessel. At least one purge and vacuum tube is inserted into a hole through one end ring and extended to the exterior of the chamber. A heater is placed within the supporting tool. A cover is placed over the chamber and sealed thereto.

The interior of the sealed part assembly is purged with an inert gas and evacuated. The chamber is purged with an inert gas through a tube through the cover. The heater is turned on and the chamber is pressurized through the cover tube. At the forming pressure and temperature, the bonding skin is superplastic formed against and diffusion bonded to the discrete parts and any exposed exterior surfaces of the part blank, while the discrete parts are diffusion bonded to the part blank.

Upon completion of the forming and bonding operation, the heater is turned off, pressure is released and the assembly is removed from the chamber. Any desired machining operations on the assembly is removed from the chamber. Any desired machining operations on the assembly, and removal of the end rings if necessary, are accomplished and the product is complete.

As can be seen, only simple tooling is required for the production of fairly complex parts. Also, since the assembly is heated from inside the part, little energy is required since the entire chamber need not be heated.

BRIEF DESCRIPTION OF THE DRAWINGS

The invention will be more readily understood upon reference to the detailed description of certain preferred embodiments which follows, taken in conjunction with the accompanying drawing, wherein.

DETAILED DESCRIPTION OF PREFERRED EMBODIMENT

Figure 1:
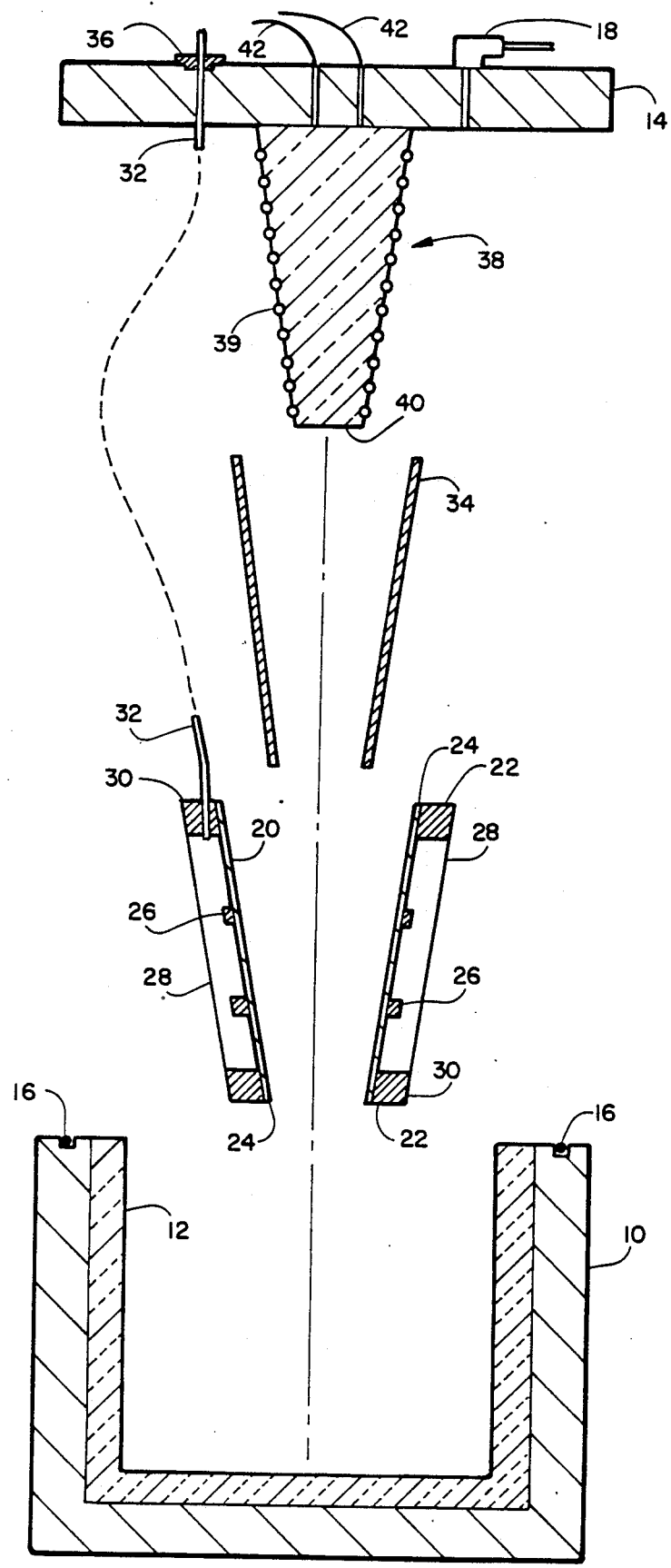
FIG. 1 is a schematic exploded axial section view illustrating the forming and bonding apparatus.

Referring now to FIG. 1, there is seen a schematic exploded view of an apparatus for forming and bonding parts. A pressure chamber 10 is provided, lined with insulation 12. A cover 14 is provided to close chamber 10. An O-ring 16 provides a gas-tight seal. At least one tube 18 is provided through cover 14 for the introduction of an inert gas to purge and pressurize chamber 10.

Figure 2:
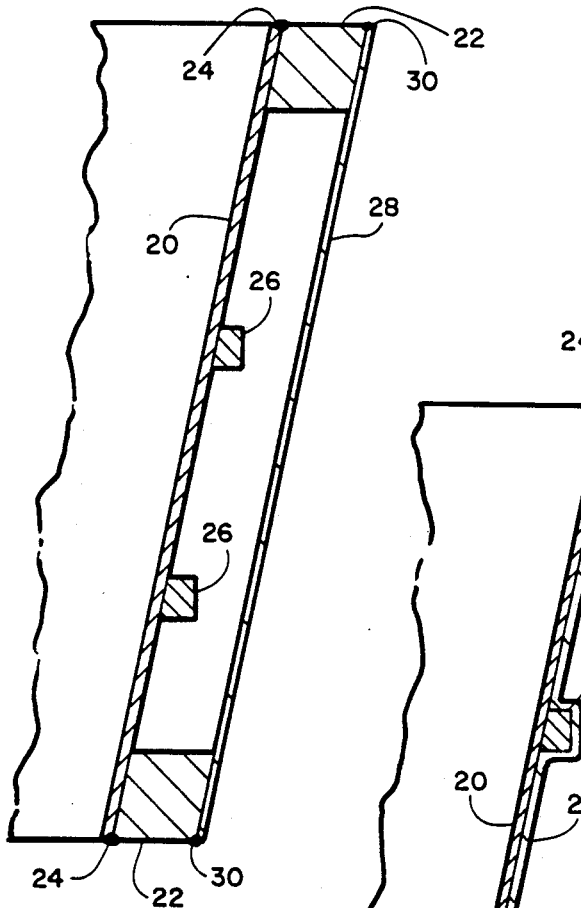
FIG. 2 is a detail section view showing the part assembly just before bonding and forming.

An assembly of parts to be formed and bonded is prepared (as shown in greater detail in FIG. 2) by providing a part blank 20 which is preferably a surface of revolution, although blanks having flat, elliptical or other surfaces may be used if desired. A pair of end rings 22 are secured to the exterior of part blank 20 by a gas tight thin weld bead at the outer corners, as most clearly shown in FIG. 2. Other discrete parts 26 which may be rings or other parts, are secured to part blank 20, such as by spot tack welding. A bonding skin 28 is then placed over the assembly and sealingly secured to rings 22 such as by thin weld bead 30. At least one thin hole is provided through an end ring 22 through which a tube 32 extends from the outside of cover 14 so that the interior of the parts assembly can be purged with an inert gas and evacuated. While one tube 32 is shown for clarity, two or more may be used if desired.

A hollow forming tool 34 is inserted into part blank 20. A gas tight assembly of titanium parts is made. It is loosely located on the form tool and held in place by a plurality of stops. The tool 34 and titanium parts assembly is placed in the center of the cold wall pressure vessel 10. The pressure vessel cover 14 with heaters 38 attached is put in place and sealed to withstand the forming gas pressure. The heaters 38 are turned on to heat the forming tool 34. The forming tool thermally expands (twice as much as titanium) to contact the titanium, thereby heating and expanding the titanium assembly. The pressure vessel is pressurized with argon at a uniform rate (to provide the proper strain rate on the thin titanium diaphragm 28 which supplies a uniform bonding pressure which is difficult to achieve with machined matched tools. After holding the pressure for one hour, the heaters 38 are turned off. The pressure vessel is opened, and the cover and heaters are removed. As the tool 34 cools it will shrink away from the part 20 leaving a formed and bonded titanium assembly. Tool 34 may be formed from any suitable metal which is surface treated, such as by stop-off boron nitride, to avoid bonding to the part blank 20. While a one-piece tool 34 is preferred, if the inside shape of part blank 20 is such as to prevent insertion of a one-piece tool; a segmented tool may be used.

The superplastic forming/diffusion bonding method of the present invention will now be reviewed in greater detail. Heater 38 is placed within tool 34. Heater 38 as shown includes a resistance heater wire 39 wound on a ceramic core 40. If desired, other compact heating means may be used, such as induction heaters. Heater 38 may be a separate unit placed in tool 34 or may be mounted on cover 14 and inserted when the cover is placed on the chamber. Heater 38 is powered through electrical wires 42 extending through cover 14. Cover 14 is placed on chamber 10 and sealed thereto by O-ring 16. Tube 32 slides through the hole in cover 14 until the cover is in place, then seal 36 seals the tube/cover interface against pressure leaks.

The interior of the part assembly is purged with an inert gas through one or more tubes 32, then that space is evacuated. The interior of chamber 10 is pressurized to a pressure, typically, of about 100–200 psig normal for superplastic forming, 300 psig normal for superplastic forming/diffusion bonding. Meanwhile, heater 38 is turned on and heats the part assembly to a typical temperature for titanium of about 1700° F. The temperature will, of course, be selected according to the diffusion bonding temperature of the part metals selected. The part metals are selected from the class of metals subject to being superplastically formed. After about 60 min. the pressure is released and the heater turned off. Cover 14 and heater 38 are removed, the part and tool 34 removed and the tool is removed from the part.

Figure 3:
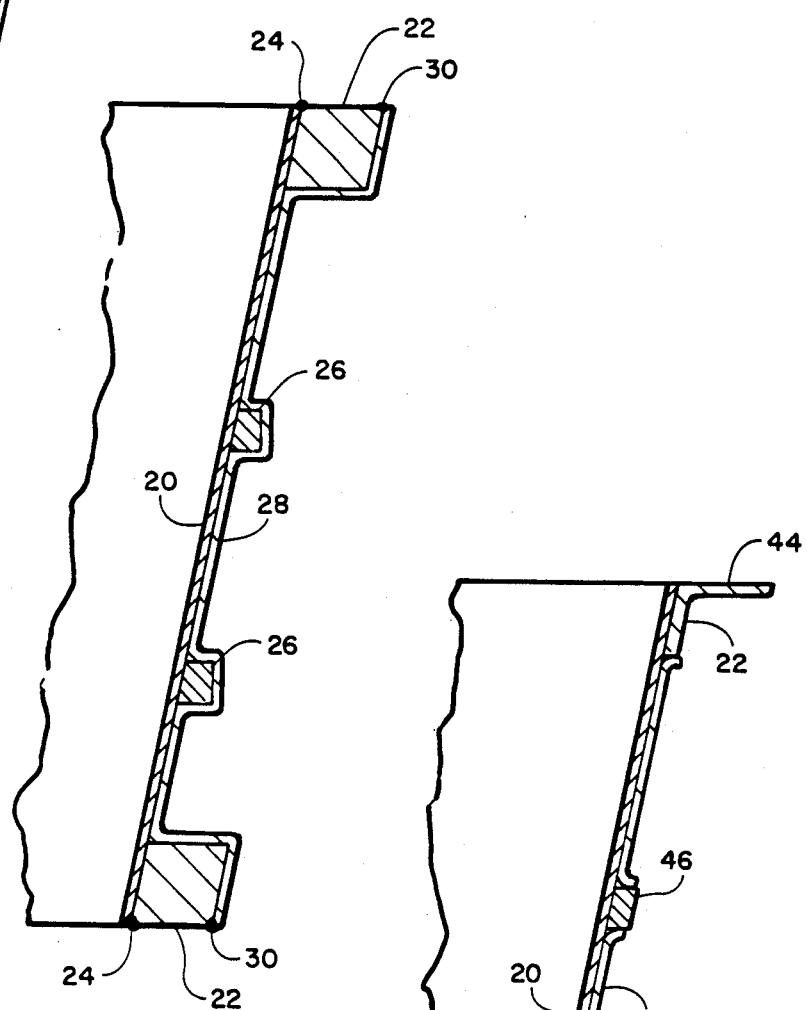
FIG. 3 shows the assembly of FIG. 2 just after completion of the forming and bonding operation.
Figure 4:
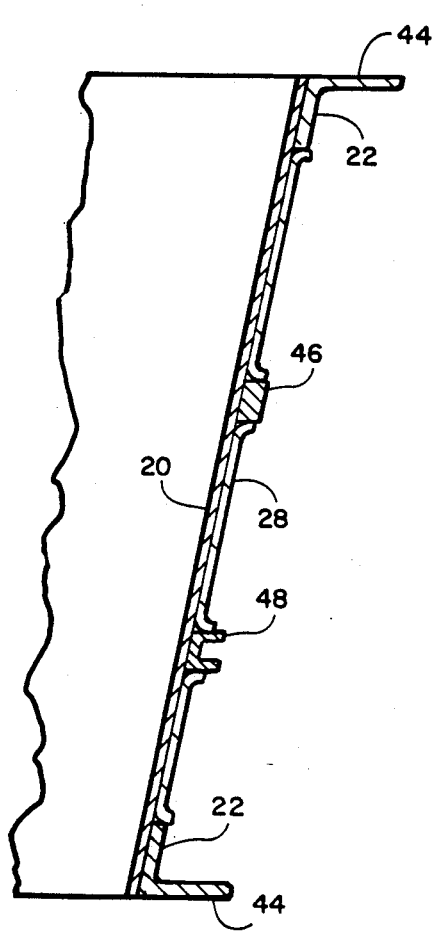
FIG. 4 shows the assembly of FIG. 2 upon completion of finish machining steps.

The product has a cross section detail as shown in FIG. 3. Bonding skin 28 has been pressed tightly against part blank 20, parts 26 and end rings 22. All components are diffusion bonded into a single unitary product by diffusion bonding.

While the product as shown in FIG. 3 may be used in that configuration, often detail machining is desirable to produce a final part configuration. If desired, end rings 22 which sealed the ends between part blank 20 and bonding skin 28 can be cut or machined away entirely. However, in most cases mounting flanges are preferred at the ends of tubular parts. Thus, end rings 22 may, for example be machined into the form of flanges 44. Similarly, parts 26 may be machined into the form of precisely shaped reinforcement rings 46 or attachment rings 48.

Thus, it can be appreciated that this method and apparatus may be used in the manufacture of a variety of complex parts, using low cost tooling and with high energy efficiency. While certain preferred materials and configurations were detailed in the above description of a preferred embodiment, these can be varied, where suitable, with similar results.

I claim:

1. A method for superplastic forming and diffusion bonding of hollow metal parts which comprises the steps of:

preparing a pair of concentric metal parts which are surfaces of revolution;

placing selected discrete metal parts between said parts intermediate the axial ends thereof;

closing the spaces between the axial ends of said parts to produce a part assembly;

inserting a hollow tool into said part assembly, the exterior surface of said tool being in uniform contact with the interior surface of the inner concentric part;

placing said part assembly and tool in a pressure chamber;

placing a heater inside said hollow tool;

closing said chamber;

evacuating the interior of said part assembly;

activating said heater to heat said part assembly to the diffusion bonding temperature of the part metals;

pressurizing the interior of said chamber; and whereby the outer concentric metal part is forced into contact with said discrete parts and said inner concentric part and all parts comprising the part assembly are diffusion bonded to form a unitary product.

2. The method according to claim 1 including the further step of selectively machining the exterior of the diffusion bonded product.

3. The method according to claim 1 wherein said parts comprise titanium and said part assembly is heated to a temperature of about 1700° F.

4. The method according to claim 1 wherein said concentric parts comprise a pair of concentric frusto-conical parts and said axial end spaces are filled by metal rings secured to said concentric parts by weld beads.

5. Apparatus for superplastic forming and diffusion bonding of hollow metal parts which comprises:
a pressure chamber;
a cover adapted to sealingly close an opening in said chamber;
a tubular tool adapted to be positioned in said chamber adapted to receive a part assembly having an inner surface corresponding to the exterior surface of said tool, said part assembly having a sealed interior volume;
heater means adapted to be positioned within said tubular tool;
tube means adapted to extend through said cover into said sealed interior volume; and
means to introduce gas under pressure into said chamber;
whereby a metal part assembly is superplastic formed against said tool and diffusion bonded into a unitary product upon evacuation of said interior volume, activation of said heater and pressurization of said chamber.

6. The apparatus according to claim 5 wherein said heater is a resistance heater mounted on said cover, adapted to be inserted into said hollow tool upon closure of said cover.

* * * * *